United States Patent [19]

Klein et al.

[11] 4,277,099
[45] Jul. 7, 1981

[54] MOTOR VEHICLE WITH AT LEAST ONE DOOR

[75] Inventors: Wilhelm Klein, Aidlingen; Max Bausch, Sindelfingen; Dieter Eckert, Magstadt, all of Fed. Rep. of Germany

[73] Assignee: Daimler-Benz Aktiengesellschaft, Stuttgart, Fed. Rep. of Germany

[21] Appl. No.: 4,880

[22] Filed: Jan. 19, 1979

[30] Foreign Application Priority Data

Jan. 19, 1978 [DE] Fed. Rep. of Germany ....... 2802140

[51] Int. Cl.³ .............................................. B60J 5/04
[52] U.S. Cl. ...................................... 296/146; 49/490
[58] Field of Search ...................... 296/146, 151, 207; 49/470, 485, 489, 484, 491, 483, 498, 490

[56] References Cited

U.S. PATENT DOCUMENTS

| 2,498,851 | 2/1950 | Doty | 49/490 |
| 3,106,422 | 10/1963 | White | 49/498 X |
| 3,638,359 | 2/1972 | Kruschwitz | 49/490 |
| 3,726,559 | 4/1973 | Wilfert et al. | 296/146 |
| 4,047,751 | 9/1977 | Koike | 296/146 |
| 4,085,966 | 4/1978 | Ringe | 296/146 |
| 4,162,097 | 7/1979 | Scribner | 296/146 X |
| 4,196,929 | 4/1980 | Bauer | 296/146 X |

Primary Examiner—John J. Love
Assistant Examiner—Norman L. Stack, Jr.
Attorney, Agent, or Firm—Craig and Antonelli

[57] ABSTRACT

A combination of several seals at the juncture of a vehicle door engaging a resilient sealing strip on the lower portion of the vehicle door.

5 Claims, 1 Drawing Figure

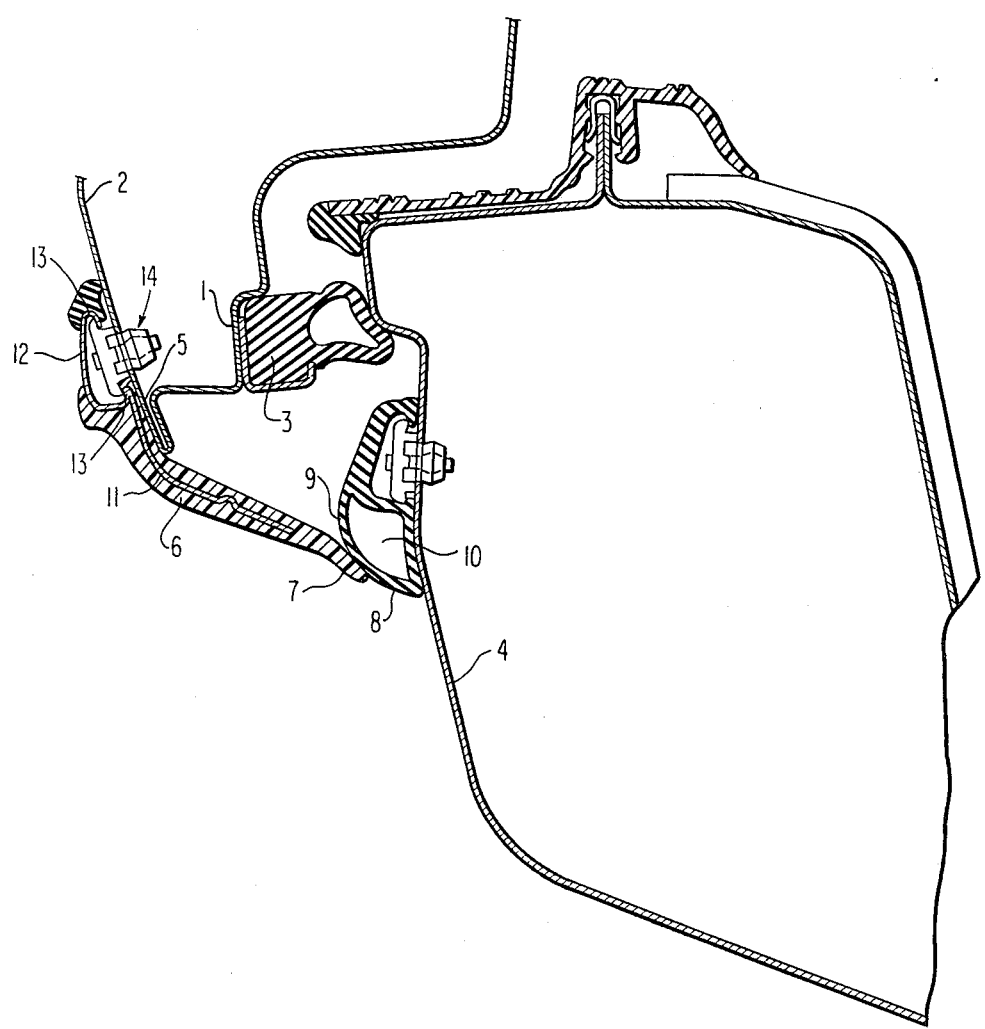

MOTOR VEHICLE WITH AT LEAST ONE DOOR

The invention relates to an automotive vehicle with at least one door inserted in a door cutout limited at the bottom by a side rail, a weather strip covering, when the door is closed, the upper zone of the side rail being arranged at the outer, lower edge of this door.

An arrangement of such weather strips to cover the lower zone of the door cutout and to prevent soiling of the side rail in the region which could come into contact with clothing of the vehicle's occupants when getting out of and into the car is known, for example, from U.S. Pat. No. 3,726,559, and has the disadvantage that, in case of certain weather conditions, the weather strip freezes to the side rail, so that opening of the door is frequently possible only with the destruction of the weather strip. The invention is based on the object of overcoming this disadvantage. According to the invention, this object has been attained by providing at the side rail a sealing strip equipped with a cavity, the free end of the weather strip contacting the outer cavity wall of this sealing strip.

By means of the invention, an elastic contact of the weather strip against the sealing strip is attained, without impairment of the sealing action, so that, with the weather strip being frozen solid, the door can yet be opened readily and without destroying the gasket. Besides, it is advantageously possible to provide the weather stripping according to this invention also at those locations where a relatively great distance must be bridged between the outside lower door edge and the side rail, because on account of the sealing strip at the side rail, the weather strip can be made shorter and thus in total more elastic.

The subject matter of this invention will be explained in greater detail with reference to a vertical section through the lower zone of a vehicle door illustrated in the drawing.

A sealing means 3 is arranged at the lower, inner rim 1 of a vehicle door 2, this sealing means, when the door is closed, being in contact with the side rail 4 defining the lower door cutout. For purposes of providing additional sealing action and for keeping the region of the side rail 4 free from dirt, which could come into contact with car occupants' clothing when getting in or out of the car, a weather strip 6 is attached at the lower outer edge 5 of the vehicle door 2. This weather strip sealingly contacts with its free end 7 the outer wall 8 of the cavity 10 formed by a sealing strip 9 attached to the side rail 4, in such a way that the outer wall 8 is urged by the weather strip 6 inwardly into the cavity 10.

A metallic reinforcement 11 is located within the weather strip 6, this reinforcement being fashioned in the zone of the mounting of the weather strip to the vehicle door 2 as a decorative molding 12 visible from the outside. As shown in the drawing, this metallic reinforcement also serves to attach the weather strip 6 to door 2 due to the flange-like edges 13 being secureable to flanges of a fastener indicated generally at 14.

What is claimed is:

1. A motor vehicle body construction comprising:
    passenger door means arranged on at least one side of a vehicle body;
    side rail means forming an outer wall of the vehicle body and having a surface facing said door means in a closed position of said door means, said side rail means extending from underneath to above a lower edge of said door means; and
    sealing means for preventing soiling of an upper area of said side rail means, said sealing means comprising a first resilient seal means on a lowermost portion of said door means and a second resilient seal means on said surface of the side rails means, said first and second seal means being mutually engaged in said closed position of the door means, wherein said second seal means is provided with cavity means for rendering an outer wall of the second seal means resiliently, inwardly displaceable, said first seal means being positioned relative to said second seal means so as to cause the first seal means to urge said outer wall inwardly in said closed position of the door means whereby seal means freezing problems are minimized.

2. A motor vehicle body construction according to claim 1, wherein a third resilient seal means is provided on a lowermost innerside portion of said door means for enabling said third seal means to engage said side rail means at a location spaced from and above said second seal means in said closed position of the door means.

3. A motor vehicle body construction according to claim 2, wherein said third seal means is provided with cavity means for rendering an outer wall of the second seal means resiliently, displaceable by action of said engagement of the third seal means with said side rail means in said closed position.

4. A motor vehicle body construction according to either claims 1 or 2, wherein said first seal means comprises a weather strip of resilient material and metallic reinforcement means partially embedded therein, an exposed portion of said reinforcement means forming a decorative molding visible on the outside of said door means.

5. A motor vehicle body construction according to claim 4, wherein said exposed portion serves additionally as a means for attaching said weather strip to said door means.